Dec. 8, 1925. 1,565,061
A. COTTON
METHOD AND APPARATUS FOR MAKING SECTIONAL HEADERS
Filed Aug. 4, 1923 6 Sheets-Sheet 1

INVENTOR
Alfred Cotton.
By Bakewell & Cornwell
ATTORNEYS

Dec. 8, 1925.　　　　　　　　　　　　　　　　1,565,061
A. COTTON
METHOD AND APPARATUS FOR MAKING SECTIONAL HEADERS
Filed Aug. 4, 1923　　　　6 Sheets-Sheet 3

INVENTOR
Alfred Cotton
By Bakewell & Church
ATTORNEYS

Dec. 8, 1925.  1,565,061
A. COTTON
METHOD AND APPARATUS FOR MAKING SECTIONAL HEADERS
Filed Aug. 4, 1923  6 Sheets-Sheet 4

INVENTOR
Alfred Cotton.
By Bakewell Church
ATTORNEYS

Patented Dec. 8, 1925.

1,565,061

UNITED STATES PATENT OFFICE.

ALFRED COTTON, OF ST. LOUIS, MISSOURI, ASSIGNOR TO HEINE BOILER COMPANY, OF ST. LOUIS, MISSOURI, A CORPORATION OF MISSOURI.

METHOD AND APPARATUS FOR MAKING SECTIONAL HEADERS.

Application filed August 4, 1923. Serial No. 655,667.

To all whom it may concern:

Be it known that I, ALFRED COTTON, a citizen of the United States, residing at St. Louis, Missouri, have invented a certain new and useful Improvement in Methods and Apparatus for Making Sectional Headers, of which the following is a full, clear, and exact description, such as will enable others skilled in the art to which it appertains to make and use the same.

This invention relates to sectional headers of the type that are produced by deforming a wrought iron or drawn metal tube in such a way as to construct a hollow member, capable of being used as a header for a vertical row of staggered tubes, and having irregularly-shaped side portions of such form that a plurality of such headers can be arranged vertically, side by side, in nested relation.

My present application is a continuation in part of my pending application Serial No. 596,432, filed Oct. 23, 1922, wherein I have illustrated and described a sectional boiler header which is distinguished from the conventional sectional serpentine boiler header now in general use, in that the tube from which the header is constructed is deformed by pressure applied externally to the tube in such a way as to form a header, each of whose lateral sides is made up of diametrically-opposed ridges arranged in alternate relation with diametrically-opposed valleys, and whose front and rear sides have portions in which hand holes and boiler tube holes are adapted to be formed.

One object of my present invention is to provide a practicable machine of simple design for producing a sectional header of the general type disclosed in my said pending application for patent.

Another object is to provide a machine of the kind referred to which is so designed that it will produce flat surfaces for the hand holes and tube holes simultaneously with the operation of crimping the tube to form alternating series of oppositely-disposed valleys and ridges in the lateral sides of the header and alternately-arranged wide and narrow parts in the front and rear sides of the header.

Another object is to provide a novel method of constructing a sectional header from a welded or drawn metal tube.

And still another object is to provide a novel mandrel for internally supporting a metal tube during the operation of deforming said tube to produce a header for boiler tubes or the like.

Figure 1 of the drawings is a perspective view of a portion of a boiler header which my improved machine is capable of producing, but with the ends of the header unfinished.

Fig. 2 is a side elevational view of said header.

Fig. 3 is an elevational view of the rear side of the header.

Fig. 4 is a vertical sectional view of said header, taken on the line 4—4 of Fig. 3.

Fig. 14ª is a detail sectional view, illustrating the mandrel support and the means for preventing the mandrel for shifting relatively to said support.

I have herein illustrated my invention embodied in a machine that is designed to produce a sectional boiler header that is disposed vertically when arranged in operative position in a boiler equipped with inclined water tubes, and which is so constructed that it will serve as a header for one and one-half rows of staggered boiler tubes, but I do not wish it to be understood that my machine is limited in its use to the manufacture of a boiler header of this particular design. As shown in Figs. 1, 2, 3 and 4, said header is provided with two corrugated lateral side portions, each of which is made up of a series of valleys 1 arranged in alternate relation with a series of ridges 2 and disposed diametrically opposite the valleys and ridges on the other lateral side of the header, a front portion that is provided with a group of relatively wide flat faces 3 that extend transversely of the header and a group of relatively narrow flat faces 4 that lie between said wide faces, and a rear portion provided with a group of relatively wide flat faces 3ª and a group of relatively narrow flat faces 4ª arranged in alternate relation. Before the header is arranged in operative position in the boiler, holes are formed in the flat faces 3ª and 4ª on the rear side of the header, so as to receive the water tubes of the boiler, and holes are formed in the flat faces 3 and 4 on the front side of the header, so as to form hand holes through which a tool can be inserted to expand the ends of the water tubes during the operation of connecting said tubes to the header, the hand holes in the front side of the header being normally closed by hand hole covers or plates of any suitable design. Owing to the fact that the portions in the front and rear sides of the header that contain the flat faces 3 and 3ª are wider than the portions in the front and rear sides of the header that contain the flat faces 4 and 4ª, it is possible to form two tube holes in each of the wide flat faces 3ª on the rear side of the header, thereby enabling the header to be used with one and one-half staggered rows of boiler tubes, and consequently, reducing the number of headers in the boiler, as explained in my said pending application for patent.

As previously stated, however, my machine is not limited to the manufacture of a header provided on its front and rear sides with wide flat faces, each of which has two holes formed in same, and narrow flat faces each equipped with a single hole.

The flat faces on the front and rear sides of the header in which the hand holes and tube holes are formed are inclined slightly to the vertical, as shown in Fig. 4, so as to form seats for the tubes and seats for the gaskets of the hand hole covers that are disposed at right angles to the longitudinal axis of the boiler tubes, each of the flat hand hole portions on the front side of the header being arranged slightly higher than the particular tube hole portion on the rear side of the header with which it co-operates so that the hand holes will be arranged diametrically opposite the boiler tubes and in longitudinal alignment with said tubes, this feature of the header being illustrated clearly in Fig. 4, wherein the dot and dash lines indicate the center lines of the boiler tubes and the center lines of the co-operating flat faces on the front and rear sides of the header.

It will be noted, by reference to Figs. 1 to 4, that the valleys 1 in the sides of the header are formed by diametrically-opposed, inwardly-pressed portions of the tube from which the header is constructed, and that the ridges 2 in the side portions of the header are formed by diametrically-opposed portions of said tube that bulge laterally in opposite directions from the center line of the header. Also that the valleys and ridges at each side of the header are disposed in parallel relation to each other, but are inclined slightly to the horizontal, so as to extend in the same general direction as the tubes of the boiler. By referring to Fig. 2 it will be noted that the portions on the front side of the header that are located at the front ends of the valleys 1 in the sides of the header bulge forwardly and that the portions on the rear side of the header that are located at the rear ends of said valleys bulge rearwardly, thus virtually forming groups of transversely-disposed valleys in the front and rear sides of the header that lie between groups of transversely-disposed ridges or bulges in the front and rear sides of the header. These valleys and ridges in the lateral sides and in the front and rear portions of the header are produced by subjecting the tube from which the header is formed to external pressure exerted inwardly towards the center of the tube, the inward pressure being exerted on the tube in four different directions by dies. In the preferred form of my invention herein illustrated certain portions of the tube are supported by an internal mandrel during the deforming operation, and the dies which act on the parts of the tube that constitute the front and rear portions of the header are of such shape that they will co-operate with said internal mandrel to form the flat tube hole and hand hole portions 3, 3ª, 4 and 4ª during the operation of forming the valleys and ridges in the lateral sides of the header. In instances where it is not desired to deform the tube in a single operation it is not absolutely necessary that an internal mandrel be used.

Figure 5:
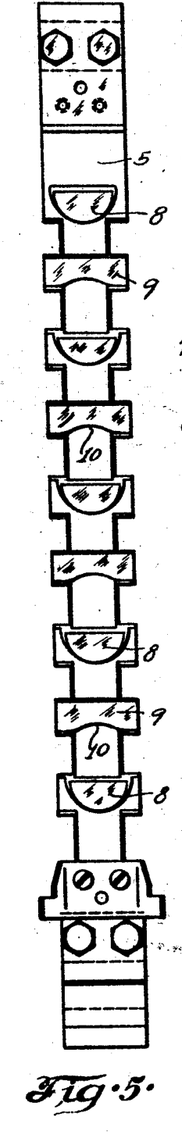
Fig. 5 is an elevational view of the rear side of the internal mandrel used in the operation of deforming the tube.
Figures 6, 7:
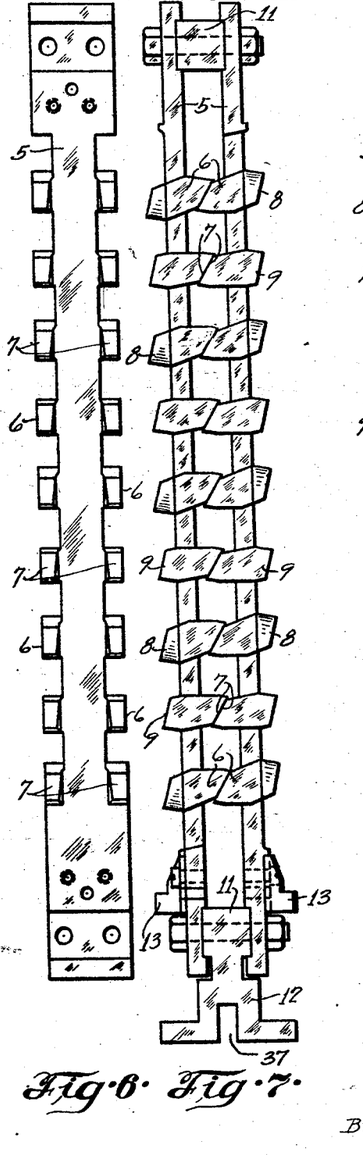
Fig. 6 is a rear elevational view of the front member of said mandrel.
Fig. 7 is a side elevational view of the mandrel, showing the mandrel expanded.
Figure 8:
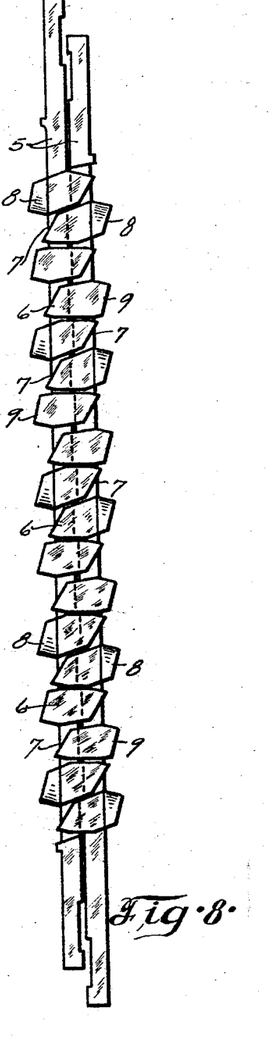
Fig. 8 is a side elevational view, showing the mandrel collapsed.
Figures 9, 10:
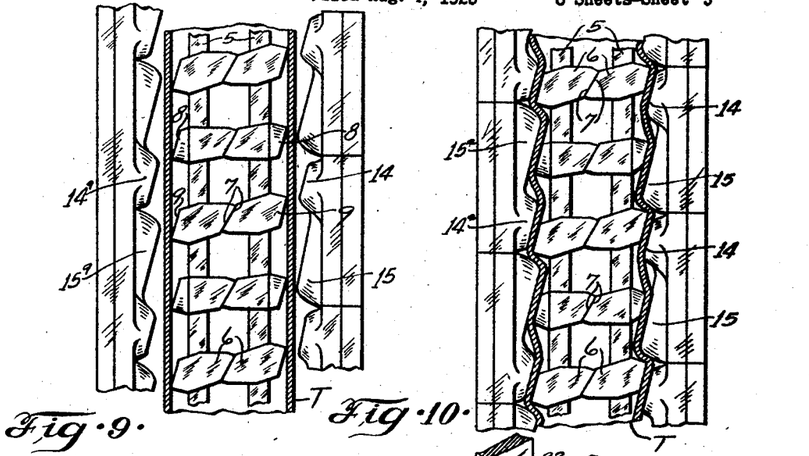
Fig. 9 is a vertical sectional view, showing a tube arranged in operative position in the machine, with the mandrel expanded and the front and rear dies in their open position.
Fig. 10 is a vertical sectional view, showing the front and rear dies closed.

Preferably, a welded or drawn tube of cylindrical or oval shape in cross section is used to form the header, and the machine in which said tube is deformed is provided with two right-angularly-disposed sets of dies that act on opposed portions of the tube simultaneously in such a way as to bend the tube into the shape shown in Fig. 1 without subjecting any portion of the tube to destructive shearing stresses. If an internal mandrel is used to support certain portions of the tube during the deforming operation said mandrels can be of any preferred construction so long as it is of such design that it can be collapsed to facilitate the withdrawal of same from the header at the completion of the deforming operation. The mandrel that I prefer to use is of novel construction and is composed of two bar-like members 5 arranged in parallel relation and provided on their side edges with angularly-disposed abutments 6 that have co-operating inclined surfaces 7 which engage each other when the mandrel is expanded, as shown in Figs. 7, 9 and 10, thereby effectively taking up the inward thrusts to which the members 5 are subjected when the front and rear dies move inwardly, as hereinafter described. The member 5 at the front side of the mandrel is provided on its front face with a group of die elements 8 of substantially semi-circular shape in outline and a group of substantially oblong-shaped die elements 9 arranged horizontally in alternate relation with the die elements 8 and each provided at approximately its center with a curved or concaved recess 10. Two similar groups of die elements 8 and 9 are arranged on the outer face of the member 5 at the rear side of the mandrel, but the convexed surfaces on the die elements 8 and the concaved recesses 10 of the die elements 9 on the front member 5 are disposed oppositely to those on the rear member. Thus, as shown in Fig. 5, the convexed surfaces of the die elements 8 on the rear member are presented downwardly, whereas, the convexed surfaces of the die elements 8 on the front member of the mandrel are presented upwardly. The members 5 are held in spaced relation by the abutment devices 6, previously described, and transversely-disposed spacing blocks 11 which are arranged between said members at the ends of the mandrel, as shown in Fig. 7. When it is desired to collapse the mandrel, as shown in Fig. 8, the spacing blocks 11 are removed and one of the members 5 is moved longitudinally relatively to the other so as to cause the inclined surfaces 7 on the abutment devices 6 to slide over each other. The mandrel is provided at its lower end with a base piece 12 which rests on a horizontally-disposed support during the deforming operation, and the mandrel is also provided adjacent its lower end with laterally-projecting centering devices 13 that hold the tube centered with relation to the mandrel before the dies are moved inwardly to deform the tube.

Figures 11, 12, 13:
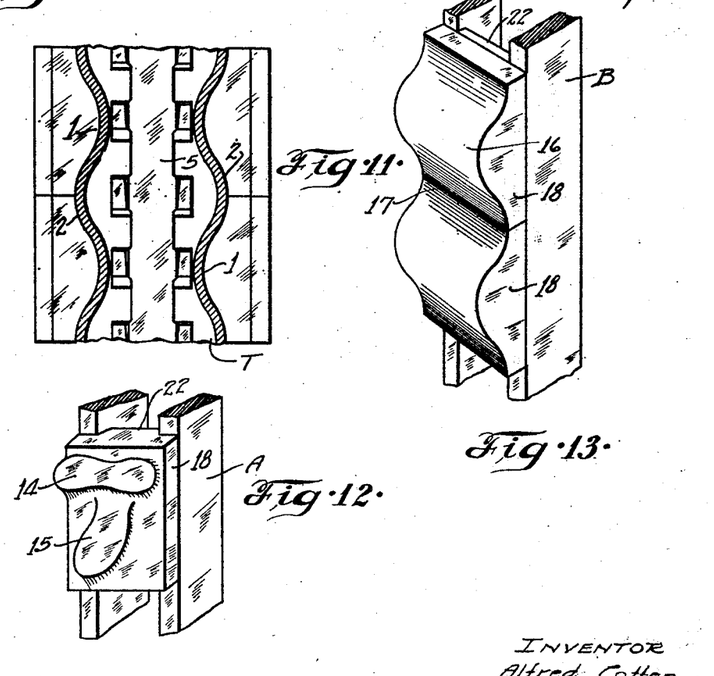
Fig. 11 is a vertical sectional view, showing the side dies closed.
Fig. 12 is a perspective view of a portion of the front die carrier, showing one of the die units mounted thereon.
Fig. 13 is a perspective view of one of the side die carriers.

The front die is of the construction shown in Figs. 9, 10 and 12 and is provided with a series of wide, flat-faced pressing portions 14 arranged in alternate relation with a series of narrow, flat-faced pressing portions 15, the operating faces of both of said series of pressing portions being inclined slightly to the vertical, as shown in Figs. 9 and 10. The rear die is of similar construction and is made up of two alternately-arranged series of flat-faced pressing portions 14$^a$ and 15$^a$ having flat operating faces that are inclined oppositely to the operating faces of the pressing portions 14 and 15 of the front die. Each of the wide portions and narrow pressing portions 14 and 15 on the front die co-operate with certain wide and narrow pressing portions on the rear die, and the front and rear dies are so disposed with relation to each other and with relation to the internal mandrel that when said dies move inwardly into engagement with the tube, the wide portions 14 and 14$^a$ of said dies will press portions of the tube inwardly against the oblong-shaped die elements 9 on the mandrel, thus forming the wide, flat faces 3 and 3$^a$ in the front and rear sides of the tube, and the narrow portions 15 and 15$^a$ of said dies will press portions of the tube inwardly against the die elements 8 on the mandrel, thus forming the narrow, flat faces 4 and 4$^a$ in the front and rear sides of the tube.

Each of the side dies is of the construction shown in Fig. 13 and comprises a series of ribs 16 disposed at a slight angle to the horizontal and arranged in alternate relation with a series of recesses 17. Each of the dies above referred to can be constructed in the form of a single unit having integral pressing portions on same, or each of said dies may be made up of a number of separate sections or units detachably connected to a die carrier, it being preferable to construct each of the dies from a plurality of die units 18, as shown in Figs. 12 and 13, so as to enable the dies to be changed easily when headers of different length or of different form are to be constructed in the machine.

So far as my broad idea is concerned, it is immaterial how the dies are arranged and operated, so long as said dies are disposed in parallel relation with the tube that is to be deformed and are moved first inwardly towards the longitudinal axis of the tube to press the tube into the shape shown in Fig. 1, and then outwardly away from the center line of the tube, so as to permit the header to be removed from the machine. In the machine herein shown the front, rear and side dies are arranged vertically in symmetrical relation around a vertically-disposed mandrel over which the tube T that is to be deformed is telescoped, as shown in Fig. 9, and the die carriers on which said dies are mounted are supported by links that are adapted to be rocked in one direction so as to move the dies into engagement with the tube and then rocked in the opposite direction to disengage the dies from the header which is thereafter removed from the machine and the mandrel withdrawn from the header. It is obvious, however, that the die carriers could be so constructed and arranged as to reciprocate in a straight path towards and away from the mandrel. The machine herein illustrated is provided with a vertically-disposed front die carrier A arranged diametrically opposite a vertically-disposed rear die carrier A' and two side die carriers B and B' arranged at right angles to the front and rear die carriers, each of said die carriers being composed of two flat bars that are held in spaced relation by spacing sleeves 20 through which connecting bolts 21 pass, thus forming a die carrier having a center space or slot that receives ribs 22 on the separate units 18 of the die mounted on the carrier, as shown in Figs. 12, 13 and 15. Each of the die units 18 is detachably connected to its carrier, as for example, by a bolt or other suitable device 23 that passes through a clamping plate 24 which bears against the rear side of the die carrier, and if desired, adjusting screws or binding screws 25 can be arranged at the upper ends of the die carriers, as shown in Fig. 14, so as to exert endwise pressure on the group of units 18 that make up a die.

Figure 14:
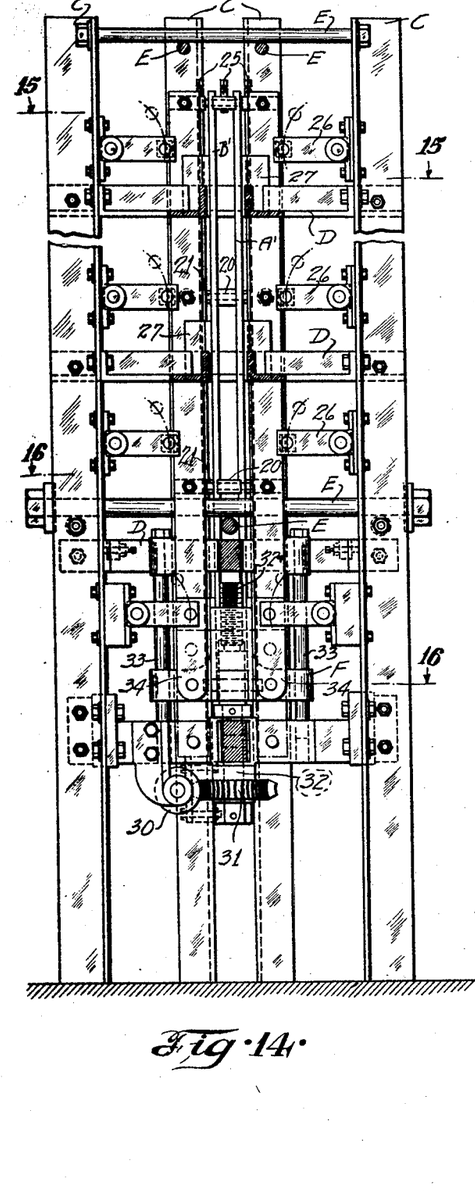
Fig. 14 is a side elevational view, partly broken away, of the complete machine, but with the dies removed.
Figure 14A:
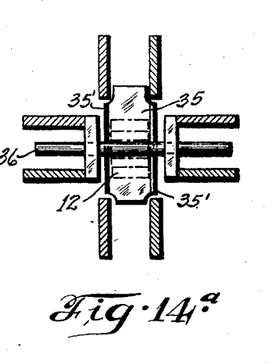
Figure 15:
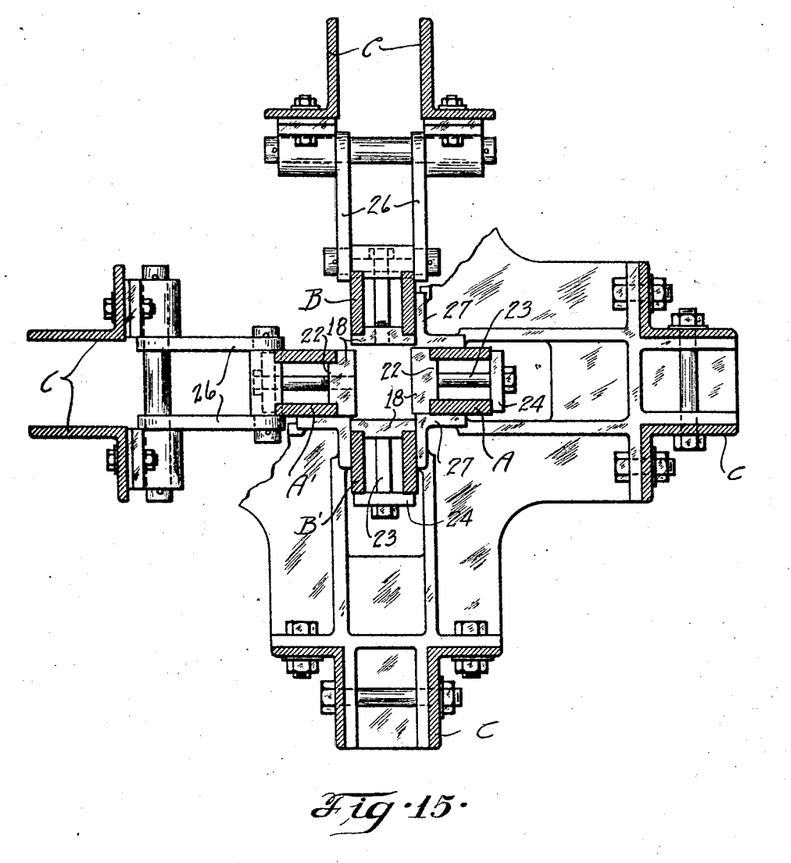
Figs. 15 and 16 are enlarged horizontal sectional views, taken on the lines 15—15 and 16—16 of Fig. 14, looking in the direction indicated by the arrows.
Figure 16:
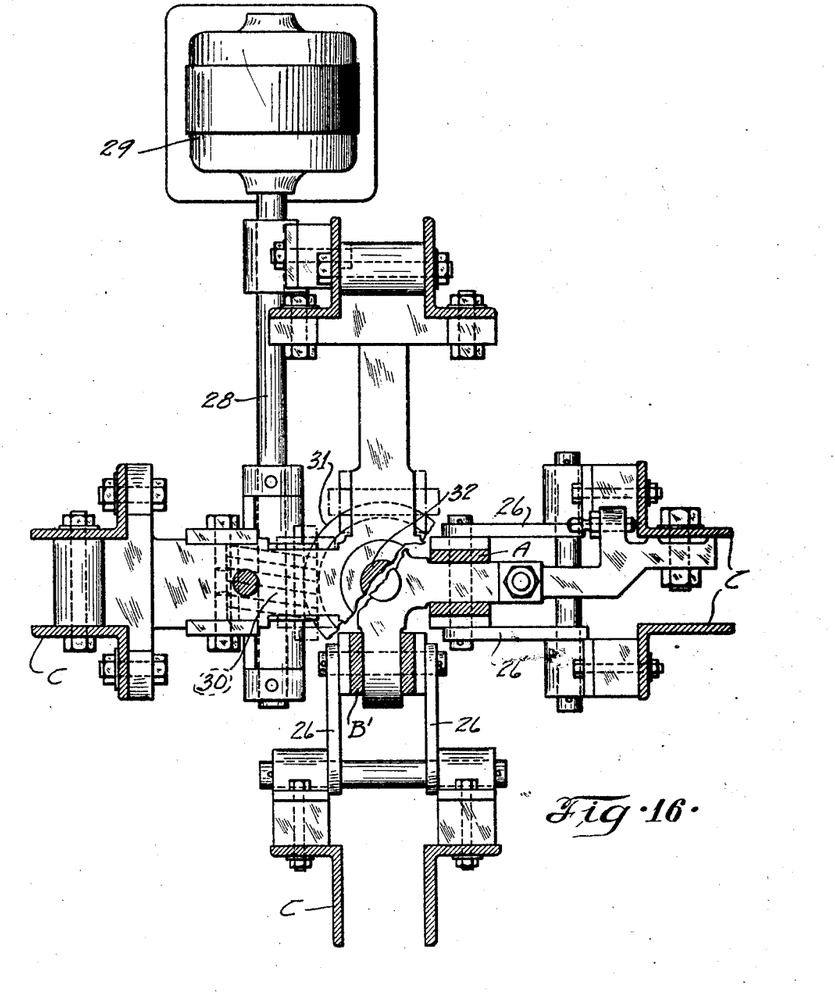

The supporting structure of the machine consists of four uprights C, a plurality of horizontally-disposed castings D connected to said uprights so as to serve as tie members and also as guides for the die carriers, and tie rods or bolts E connected to said uprights, as shown in Fig. 14. The four die carriers are connected with said uprights by swinging links 26 in such a way that when said die carriers are moved upwardly, the links 26 will swing upwardly, as indicated by the dotted arcs in Fig. 14, thus moving the die carriers outwardly away from the work, and when said die carriers are moved downwardly, the links 26 will cause said carriers to travel inwardly into engagement with the work, the horizontally-disposed castings D being provided with vertically-disposed guides 27 in which the die members slide horizontally and vertically. Any suitable means can be used for actuating the die carriers, the means herein illustrated for this purpose consisting of a horizontally-disposed drive shaft 28 operated by an electric motor 29 whose armature shaft can be revolved in clockwise and in anti-clockwise direction, a worm 30 on said drive shaft that meshes with a worm gear 31, a vertically-disposed shaft 32 connected to the worm gear 31 and provided with a screw-threaded portion 32ª that turns in a nut or internally screw-threaded hole in a vertically-reciprocating actuating member F which slides on vertically-disposed guide rods 33, as shown in Fig. 14, and links 34 pivotally connected at their lower ends to the actuating member F and pivotally connected at their upper ends to the lower ends of the die carriers. When the actuating member F is moved upwardly from the position shown in Fig. 14 by the rotation of the vertical shaft 32, the movement imparted to the die carriers by the links 34 causes the dies to move out of engagement with the work, and thereafter, when said shaft is rotated in the opposite direction, the downward movement of the actuating member F causes the dies to move inwardly and downwardly into engagement with the work. The machine is provided with a horizontally-disposed support 35, carried preferably by one of the die carriers, on which the internal mandrel is adapted to be arranged in an upright position, and in order to hold said mandrel centered, said support is provided with a pair of parallel flanges 35' that embrace the base piece 12 of the mandrel and prevent the mandrel from shifting to the right or to the left between the side die carriers. Shifting of the mandrel forwardly or rearwardly between the front and rear die carriers is prevented by a pin 36 arranged in a groove 37 in the base piece 12 of the mandrel, as shown in Fig. 7.

In manufacturing a header of the kind shown in Figures 1 to 4, the die carriers of the machine are first moved into their open position and the internal mandrel, which has previously been expanded, is arranged in a vertical position on the support 35 at the center of the machine. A heated tube T is then slipped over the mandrel, as shown in Fig. 9, and thereafter the vertical shaft 32 is rotated in a direction to cause the actuating member F to move downwardly and draw the die carriers inwardly and downwardly towards the tube that surrounds the mandrel. As all of the die carriers move inwardly and downwardly at the same time, the opposed side portions of the tube and the opposed front and rear portions of the tube will be pressed inwardly simultaneously. The inward pressure which the side dies exert on the tube press diametrically opposed portions in the sides of the tube inwardly toward each other, thereby forming valleys 1 in the lateral sides of the tube and causing portions in the front and rear sides of the tube to bulge outwardly at the ends of said valleys. The inward pressure which the front and rear dies exert on the front and rear sides of the tube press portions in the front and rear sides of the tube inwardly towards the longitudinal axis of the tube, thus forming transversely-disposed valleys and also causing portions in the lateral sides of the tube to bulge laterally in opposite directions at the ends of said transverse valleys and form the ridges or bulges 2 in the sides of the tube. By referring to Fig. 9 it will be noted that the side portions of the tube which are pressed inwardly by the ribs 16 on the side dies are not internally supported during the deforming operation, this being unnecessary, due to the fact that the circular or oval cross-section of the tube and the joint action of the front, rear and side dies prevents the tube from collapsing when the dies engage same. If the header is deformed in a single operation so as to produce flat faces on the front and rear sides of the header in which hand holes and tube holes are to be formed it is necessary to internally support the front and rear portions of the tube in which the flat faces for the hand holes and tube holes are formed, but in view of the fact that the deformation of the tube is produced by a bending operation, as distinguished from a forging operation, it is not necessary to support the front and rear portions of the tube throughout their entire area. On the contrary, it is sufficient if the tube is internally supported at points in proximity to the points where the flat-faced pressing portions on the front and rear dies act on the tube, and in the machine herein shown this internal support for the tube is obtained by the spaced die elements 8 and 9 on the front and rear sides of the mandrel. This feature of my invention is illustrated clearly in Fig. 10, wherein it will be noted that when the front and rear dies move inwardly, the pressing portions 14, 15, 14ᵃ and 15ᵃ on said dies exert inward pressure on the front and rear sides of the tube in such a way as to bend portions of the tube against the flat faces of the die elements on the mandrel and over the edges of said die elements, thereby forming indentations in the transversely-disposed valleys and bulges in the front and rear sides of the tube that can be used as seats for the boiler tubes and the hand hole covers. The transverse width of the pressing portions 15 and 15ᵃ on the front and rear dies is less than the transverse width of the bulged portions on the front and rear sides of the tube and the transverse width of the pressing portions 14 and 14ᵃ on the front and rear dies is less than the length of the transverse valleys in the front and rear sides of the tube. Consequently, when the front and rear dies move inwardly, the metal in the front and rear sides of the tube will be bent in such a way that reverse bends or folds $f$ will be formed in the front and rear sides of the header in proximity to the flat faces in which the hand holes and tube holes are formed. In order to prevent the metal in these portions of the tube from being bent abruptly, or at such a sharp angle as to tend to cause the metal to rupture, the ribs 16 on the side dies that press opposed portions in the sides of the tube inwardly to form the valleys 1 are not disposed in absolutely parallel relation to the center lines of the co-operating flat faces on the front and rear sides of the header, represented by the dot and dash lines $x$ of Fig. 4, but, on the contrary, are disposed slightly out of parallel so as to produce bulges in the front and rear sides of the tube that are of sufficient area to permit said bulges to be indented or pressed inwardly to form the flat faces 4 and 4ᵃ without causing the metal at the ends of said faces to crack. To state it in another way, the center lines of the ribs 16 on the side dies are set at a slightly greater angle to the horizontal than the center lines marked $x$ in Fig. 4, so as to produce bulged portions in the front and rear sides of the tube that are of greater area and which contain more metal than if the center lines of the ribs 16 of the side dies were arranged in absolutely parallel relation to the center lines represented by the dot and dash lines $x$ in Fig. 4.

Owing to the fact that the tube from which the header is constructed is completely deformed in practically a single operation and in one machine, the header can be manufactured cheaply, and as the tube is deformed by a bending operation and without subjecting any portions of same to abnormal shearing stresses, there is little liability of the header becoming defective when in use, due to rupture of portions of same which are subjected to abnormal strains during the deforming operation. In addition to having the desirable features previously mentioned, a header produced by my machine is of such shape that when it is arranged in operative position in a boiler pockets will be formed between the adjacent headers that effectively hold the packing used to calk the joints between the headers. The said pockets are formed by depressions 2ᵃ in the ridges 2 on the sides of the header and they are produced during the deforming operation by the natural tendency of the metal in the crowns of said ridges to cup up at the ends of the ridges when the opposed portions in the sides of the tube are bent inwardly and when the intermediate portions in the front and rear sides of the header are pressed inwardly to form the wide flat faces in which the tube and hand holes are formed. The machine herein illustrated is of simple construction and of such design that less power is required to operate it than the machines used in the manufacture of conventional sinuous boiler headers. The internal mandrel herein illustrated is also of simple construction and is of such design that it can be expanded and collapsed quickly, thus tending to reduce the cost of manufacture of the header.

While I have stated that certain portions of the tube are supported by an internal mandrel during the deforming operation, this is only necessary in the event it is desired to bulge the tube and form flat surfaces on the front and rear sides of same for the hand holes and tube holes in a single operation. In some cases it may be desirable to deform a tube in one operation so as to produce a hollow member having lateral sides made up of alternately-arranged valleys and ridges and front and rear sides having portions of appropriate area to receive tube holes and hand holes but not flat enough to form gasket seats, and then by a second operation, deform the front and rear sides of the header so as to flatten out the portions of same in which the hand holes and tube holes are formed. When such a two-step method is employed the machine herein illustrated can be used, minus the internal mandrel and equipped with front and rear dies of slightly different form from the front and rear dies herein shown.

Having thus described my invention, what I claim as new and desire to secure by Letters Patent is:

1. A machine for producing a sectional header, comprising side dies spaced apart to receive a metal tube and provided with inwardly-projecting ribs arranged diametrically opposite each other and diametrically-opposed recesses located between said ribs, front and rear dies, and pressing portions on said front and rear dies disposed in such relation with said ribs and recesses that the inward movement of all of said dies towards the center of said tube forms opposed valleys and bulges in the lateral sides of the header and bulges in the front and rear sides of the header.

2. A machine for producing a sectional header, comprising side dies provided with co-operating means for forming diametrically opposed, inwardly-pressed portions in the walls of a metal tube that is positioned between said dies, and front and rear dies provided with co-operating means for pressing opposed portions in the walls of said tube inwardly, said side dies and said front and rear dies having spaces into which portions of said tube can bulge outwardly.

3. A machine for producing a sectional header, comprising side dies spaced apart to receive a metal tube and provided with inwardly-projecting ribs arranged diametrically opposite each other and diametrically-opposed recesses located between said ribs, front and rear dies, and flat faced pressing portions on said front and rear dies for forming flat seat faces in the front and rear sides of the header.

4. A machine for producing a sectional header, comprising side dies spaced apart to receive a metal tube and provided with inwardly-projecting ribs arranged diametrically opposite each other and diametrically-opposed recesses located between said ribs, front and rear dies, and flat-faced pressing portions on said front and rear dies disposed at an angle to the longitudinal axis of the tube for forming inclined, flat seat faces in the front and rear sides of the header.

5. A machine for producing a sectional header, comprising side dies spaced apart to receive a metal tube and provided with inwardly-projecting ribs arranged diametrically opposite each other and diametrically-opposed recesses located between said ribs, front and rear dies, angularly-disposed, flat-faced pressing portions on said front and rear dies for forming flat seat faces in the front and rear sides of the header, and a removable mandrel adapted to be positioned inside of the tube and provided with means for internally supporting the parts of the tube acted upon by said flat-faced pressing portions.

6. A machine for producing a sectional header, comprising side dies spaced apart to receive a metal tube and provided with inwardly-projecting ribs arranged diametrically opposite each other and diametrically-opposed recesses located between said ribs, said ribs and recesses being disposed at a slight angle to the horizontal, front and rear dies, and pressing portions on said front and rear dies for forming flat seat faces in the front and rear sides of the header.

7. A machine for producing a sectional header, comprising side dies spaced apart to receive a metal tube and provided with inwardly-projecting ribs arranged diametrically opposite each other and diametrically-opposed recesses located between said ribs whereby the inward movement of said dies into engagement with the tube deforms the same into a header of substantially rectangular shape in cross section provided with corrugated sides and front and rear sides, each of which has a series of bulges, front and rear dies, flat-faced pressing portions on said front and rear dies of less width than the transverse width of the front and rear sides of the header, and a mandrel adapted to be removably mounted inside of the tube and provided with parts that co-operate with said flat-faced pressing portions to form folds in the front and rear sides of the header.

8. A machine for producing a sectional header, comprising corrugated side dies having inclined ribs, front and rear dies arranged in opposed relation at right angles to said side dies, means for causing said dies to move inwardly into engagement with a tube that is positioned between said dies, a collapsible mandrel adapted to be arranged inside of said tube, series of alternately-arranged wide and narrow die portions on the front and rear sides of said mandrel having inclined operating faces, and alternately-arranged series of wide and narrow pressing portions on said front and rear dies that co-operate with the die portions on said mandrel to form flat faces in the front and rear sides of the tube and bend portions in said front and rear sides inwardly over the die portions on said mandrel.

9. A machine for producing a sectional header, comprising two sets of vertically-disposed die carriers arranged at right angles to each other around a space in which a tube is adapted to be arranged vertically, a supporting structure, swinging links on said supporting structure that sustain said die carriers, and means for causing said die carriers to move longitudinally and horizontally so as to cause the dies thereon to engage and be disengaged from said tube.

10. A machine for producing a sectional header, comprising side dies adapted to be moved inwardly into engagement with a tube positioned between said dies and provided with substantially horizontally-disposed ribs and recesses for forming diametrically-opposed valleys and ridges in the lateral side portions of the tube, front and rear dies for deforming the front and rear sides of the tube, an internal mandrel provided with die portions that support certain parts of the tube acted on by the front and rear sides of said dies, and means for causing said front and rear dies to move inwardly into engagement with the tube in such a manner that they exert longitudinal pressure on the tube so as to bend portions of same over the die portions on said mandrel.

11. An internal mandrel adapted to be used for internally supporting a tube that is being deformed to produce a sectional header, composed of a plurality of members capable of being moved longitudinally relatively to each other, die portions rigidly connected to said members for supporting the tube during the deforming operation, and means for holding said members in spaced relation during the deforming operation.

12. A collapsible mandrel adapted to be used in the operation of deforming a tube to produce a sectional header, composed of a plurality of members capable of relative longitudinal movement, die portions rigidly connected to said members for supporting the tube during the deforming operation, and co-operating abutment devices on said members, for the purpose described.

13. A mandrel adapted to be used for internally supporting a tube that is being deformed to produce a sectional header, comprising a pair of long bar-like members provided on their side edges with co-operating abutment devices, die portions rigidly connected to said members, and means for holding said members in spaced relation when the mandrel is arranged inside of the tube.

14. A method of constructing a sectional header, characterized by pressing opposed portions in alternate longitudinal sections of a metal tube inwardly towards each other, and pressing opposed portions in the intermediate sections of the tube inwardly towards each other but at right angles to the inwardly-pressed portions first referred to.

15. A method of constructing a sectional header, characterized by applying external pressure to the lateral sides of a metal tube in such a way as to bend diametrically-opposed portions of the same inwardly, thereby causing bulges to be formed in the front and rear sides of the tube, and bending inwardly the portions in the front and rear sides lying between said bulges so as to form diametrically-opposed bulges on the lateral sides of the tube.

16. A method of constructing a sectional header, characterized by exerting pressure on a metal tube in directions to bend the walls of the tube into a header of substantially rectangular shape in cross section provided in its lateral sides with diametrically-opposed, inwardly-pressed portions and outwardly-bulged portions and provided in its front and rear sides with bulges arranged in staggered relation to those on the lateral sides of the header.

17. A method of producing a sectional header, characterized by exerting external pressure on the walls of a metal tube in directions to cause diametrically-opposed portions in the lateral sides of the tube to be bent inwardly and intermediate portions in the front and rear sides of the tube to be bent inwardly, pressing flat seat faces in the front and rear sides of the tube, and internally-supporting the parts of the front and rear sides of the tube that constitute said seat faces.

18. A method of constructing a sectional header, characterized by applying external pressure to a metal tube in directions to cause the tube to be bent into a header of substantially rectangular shape in cross section whose sides have diametrically-opposed valleys and ridges and whose front and rear sides have bulges arranged in staggered relation with the ridges on the lateral sides of the header, and simultaneously forming flat seat faces in the front and rear sides of the header.

19. A method of constructing a sectional header, characterized by arranging a metal tube over a mandrel having die portions, bending portions in the front and rear sides of the tube into engagement with said die portions so as to form flat seat faces, and forming by external pressure, diametrically-opposed ridges and valleys in the lateral sides of the tube.

20. A method of constructing a sectional header, characterized by arranging a metal tube over a mandrel and thereafter exerting inward pressure on the exterior of said tube in four different directions so as to form diametrically-opposed valleys and ridges in the lateral sides of the tube, and flat faces in the front and rear sides of the tube.

21. A method of constructing a sectional header, characterized by arranging a metal tube over a mandrel and thereafter simultaneously pressing opposed portions in the lateral sides and in the front and rear sides of the tube inwardly towards the longitudinal axis of the tube so as to convert the tube into a header of substantially rectangular shape in cross section provided in its lateral sides with diametrically-opposed valleys and ridges and provided in its front and rear sides with flat seat faces disposed at an angle to the longitudinal axis of the tube.

22. A method of constructing a sectional header, characterized by exerting external pressure on a metal tube in four different directions so as to bend the walls of same into a header of substantially rectangular shape in cross section having diametrically-opposed valleys and ridges in its lateral sides and having bulges in its front and rear sides, and forming flat, angularly-disposed seat faces in the front and rear sides of the header arranged so that each of said bulges contains a single seat face and the portions in the front and rear sides lying between said bulges each contain a pair of seat faces.

ALFRED COTTON.